Patented May 8, 1945

2,375,382

UNITED STATES PATENT OFFICE 2,375,382

INSECTICIDES

Kaspar Pfaff, Michael Erlenbach, and Walter Finkenbrink, Frankfort-on-the-Main-Hochst, Hans Maier-Bode, Wolfen, Kreis Bitterfeld, Kurt Meisenburg, Leverkusen, and Marianne Meisenheimer, Leverkusen-Kuppersteg, Germany, assignors to Winthrop Chemical Company, Inc., New York, N. Y., a corporation of New York No Drawing. Application March 2, 1940, Serial No. 322,018. In Germany March 25, 1939

1 Claim. (Cl. 167—33)

The present invention relates to new insecticides.

Carbazole has already been tested on a laboratory scale for combating the larva of the codling moth (*Carpocapsa pomonella*). Furthermore it has been suggested to use 9-methylol-carbazole and nitroso-carbazole as seed disinfectants and sulfonation products of carbazole in the form of the sulfonated anthracene residues as weed killer in agriculture. These compounds have, however, not yet become of importance in plant protection.

Now we have found that substitution products of carbazole containing at least at the 3- and 6-carbon atoms a substituent of the group consisting of halogen, nitro and amino are highly suitable for combating leaf-eating and sucking insects, even under open-air conditions and are capable of replacing the hitherto usual arsenical insecticides. It may be suitable to use the said compounds in admixture with inert substances, wetting agents, spreaders and stickers.

Compounds of that kind are for instance:

3.6-diamido-carbazole,
3.6-dinitro-carbazole,
3.6-dinitro-N-ethyl-carbazole,
6-chloro-3-nitro-9-ethyl-carbazole,
3-nitro-6-amido-N-ethyl-carbazole or
tetranitro-carbazole.

An agent may, for instance, be prepared from 25 per cent. of tetranitro-carbazole, 10 per cent. of cellulose pitch, 2 per cent. of a wetting agent and 63 per cent. of inert substances, such as kaolin, chalk, talcum or kieselguhr. A spray of 1 per cent. strength prepared therefrom suffices for killing for instance fruit pests, such as caterpillars of brown-tail moth (*Euproctis chrysorrhoea*) more rapidly and safely than with one of the usual sprays of calcium-arsenate or lead-arsenate this having been proved by the following comparative test:

| | Concentration used | Killing of *Euproctis chrysorrhoea*: | |
|---|---|---|---|
| | | Dead after 2 days | Dead after 4 days |
| | *Per cent* | *Per cent* | *Per cent* |
| Calcium-arsenate | 0.4 | 40 | 100 |
| Lead-arsenate | 0.4 | 40 | 100 |
| Carbazole (of 25 per cent strength) | 1.0 | 0 | 0 |
| Tetranitrocarbazole (of 25 per cent strength) | 1.0 | 100 | 100 |

The agents named may also successfully be used for the control of the spring and summer generation of vine moth (*Clysia ambiguella* and *Polychrosis botrana*), the most dangerous enemies in vine culture. Injuries on the plants treated are not noted, as this is very often the case when arsenical agents are used.

The same compounds may, of course, be applied in the form of dusts. For instance, by intimately grinding 10 per cent. of tetranitro-carbazole with 90 per cent. of talc a dust is obtained which, instead of calcium arsenate, may be used for combating for instance *Meligethes aeneus*, leaf-eating Chrysomelidae or other coleopters.

For the purpose herein described there are furthermore suitable the halogenated carbazoles, for instance 3.6-dichloro-carbazole, 1.3.6-trichloro-carbazole and the higher chlorinated carbazoles, 6-chloro-3-bromo-carbazole, 9-acetyl-6-chloro-3-bromo-carbazole, 3.6-dibromo-carbazole, tetrabromo-carbazole, pentabromo-carbazole, heptabromo-carbazole or 3.6-di-iodo-carbazole.

Among the halogenated carbazoles 3.6-dichloro-carbazole and the commercial mixtures thereof are particularly distinguished by a good efficacy, while being readily accessible for industrial purposes.

A mixture of 10 parts of 3.6-dichloro-carbazole and 90 parts of a pulverulent diluent, such as chalk, kaolin or talc, shows, for instance a very good action against the small caterpillars of *Bupalus piniarius*. If pine-trees affected by the said caterpillars are dusted with the afore-named mixture, the caterpillars at once cease eating and die after some days.

These agents may likewise be applied in the form of sprays. The spray may be applied with the same success against the caterpillars of *Bupalus piniarius* as the pulverulent agent named above.

Other pests, for instance the caterpillars of various species of Pieris and of brown-tail moth are likewise destroyed, as has been ascertained, by the mixtures described above.

The afore-named compounds may, of course, be mixed with the fungicides now generally used, such as Bordeaux mixture or preparations containing a basic copper derivative. It is thus possible to combat noxious insects and fungi in one operation.

We claim:

An insecticidal composition of matter comprising tetranitro-carbazole and an inert extender.

KASPAR PFAFF
MICHAEL ERLENBACH
WALTER FINKENBRINK
HANS MAIER-BODE
KURT MEISENBURG
MARIANNE MEISENHEIMER.